US012287192B1

(12) United States Patent
Mann (10) Patent No.: US 12,287,192 B1
(45) Date of Patent: Apr. 29, 2025

(54) FRACTIONAL AND DECIMAL RULER AND METHOD OF USE

(71) Applicant: Kynan Wyatt Mann, Altadena, CA (US)

(72) Inventor: Kynan Wyatt Mann, Altadena, CA (US)

( * ) Notice: Subject to any disclaimer, the term of this patent is extended or adjusted under 35 U.S.C. 154(b) by 0 days.

(21) Appl. No.: 17/956,115

(22) Filed: Sep. 29, 2022

(51) Int. Cl.
*G01B 3/00* (2006.01)
*G01B 3/04* (2006.01)

(52) U.S. Cl.
CPC ............... *G01B 3/006* (2013.01); *G01B 3/04* (2013.01)

(58) Field of Classification Search
CPC .................................. G01B 3/006; G01B 3/04
See application file for complete search history.

(56) References Cited

U.S. PATENT DOCUMENTS

| | | | | |
|---|---|---|---|---|
| 1,602,490 A * | 10/1926 | Homan | ...................... | G01B 3/04 33/494 |
| 1,888,305 A * | 11/1932 | Berger | ................... | G01B 3/006 D10/71 |
| 2,289,717 A * | 7/1942 | Montgomery | ........... | G06G 1/04 235/70 B |
| 4,328,618 A * | 5/1982 | Belanger | ................... | G01B 3/02 33/700 |
| 4,614,042 A * | 9/1986 | Maurer | ................... | G09B 19/24 33/494 |
| 5,101,569 A * | 4/1992 | Watkins | ................. | G01B 5/143 33/600 |
| 5,746,001 A * | 5/1998 | Fisher | ..................... | G09B 23/02 33/484 |
| 6,467,183 B2 * | 10/2002 | Larsen | ..................... | G01B 3/20 33/679.1 |
| 8,438,744 B1 * | 5/2013 | Mann | ..................... | G09B 19/02 33/DIG. 1 |
| 10,955,232 B2 * | 3/2021 | Swisterski | ............. | G01B 3/004 |
| 11,378,373 B2 * | 7/2022 | Cross | ..................... | G01B 3/004 |
| 2024/0247924 A1 * | 7/2024 | Erdfarb | ................ | G01B 3/1003 |
| 2024/0369338 A1 * | 11/2024 | Way | ..................... | G01B 3/1003 |

* cited by examiner

*Primary Examiner* — Yaritza Guadalupe-McCall
(74) *Attorney, Agent, or Firm* — Ted Masters (57) ABSTRACT

A ruler includes an elongated base having a longitudinal axis, a first outer edge, and an opposite second outer edge. A scale is received by the base and is slidably positionable along the longitudinal axis to a plurality of detent positions. The scale includes indicia depicting both fractional and decimal portions of one inch.

15 Claims, 10 Drawing Sheets

FRACTIONAL AND DECIMAL RULER AND METHOD OF USE

CROSS REFERENCE TO RELATED APPLICATION

None

TECHNICAL FIELD

The present invention pertains generally to rulers, and more particularly to a ruler which has a sliding scale.

BACKGROUND OF THE INVENTION

Rulers are well known in the art for serving as a tool for measuring a distance. The rulers have a scale Which is placed adjacent to the distance to be measured and the distance read from the scale.

BRIEF SUMMARY OF THE INVENTION

The present invention is directed to a ruler which has a sliding scale. The base of the ruler base has a central opening or slot. Notches along the sides of the slot cooperate with stops disposed in the sliding scale to provide detent positions at one inch intervals. The sliding scale includes scale indicia of both fractional and decimal portions on one inch. In an embodiment the scale indicia is of different colors to assist the user in making measurements. In another embodiment both the base and sliding scale are transparent.

In accordance with an embodiment, a ruler includes an elongated base having a longitudinal axis, a first outer edge, and an opposite second outer edge. A scale is received by the base and is slidably positionable along the longitudinal axis to a plurality of detent positions. The scale includes indicia depicting both fractional and decimal portions of one inch.

In accordance with another embodiment, the plurality of detent positions are one inch apart.

In accordance with another embodiment, the base includes a first inner edge, an opposite second inner edge, a first inner end edge, an opposite second inner end edge. The first inner edge, the second inner edge, the first inner end edge, and the second inner end edge forming a longitudinal slot. The scale is received by and longitudinally positionable along the slot.

In accordance with another embodiment, the first inner edge includes a plurality of spaced apart first notches, and the scale includes an outwardly biased first stop which engages one of the plurality of first notches.

In accordance with another embodiment, the plurality of first notches are spaced one inch apart.

In accordance with another embodiment, the second inner edge includes a plurality of spaced apart second notches, and the scale includes an outwardly biased second stop which engages one of the plurality of second notches.

In accordance with another embodiment, the plurality of second notches are spaced one inch apart.

In accordance with another embodiment, the plurality of first notches are longitudinally offset from the plurality of second notches by one half inch.

In accordance with another embodiment, the scale includes a tab, the first inner edge includes a first disassembly notch, and the second inner edge includes an opposite second disassembly notch. The first and second disassembly notches are shaped and dimensioned to allow passage of the tab.

In accordance with another embodiment, the scale includes a second tab, the first inner edge includes a third disassembly notch, and the second inner edge includes an opposite fourth disassembly notch. The third and fourth disassembly notches are shaped and dimensioned to allow passage of the second tab.

In accordance with another embodiment, the scale has scale indicia representing one inch.

In accordance with another embodiment, the scale has a bottom surface. The scale indicia is disposed on the bottom surface of the scale.

In accordance with another embodiment, the scale indicia includes;

7/8, 3/4, 5/8, 1/2, 3/8, 1/4, 1/8;
0.875, 0.75, 0.625, 0.5, 0.375, 0.25, 0.125;
15/16, 13/16, 11/16, 9/16, 7/16, 5/16, 3/16, 1/16; and,
0.938, 0.813, 688, 0.563, 0.438, 0.313, 0.188, 063.

In accordance with another embodiment, the scale indicia includes different colors.

In accordance with another embodiment, the elongated base and the scale are both transparent.

In accordance with another embodiment, the first outer edge has indicia of inches, and the second outer edge has indicia of centimeters.

Other embodiments, in addition to the embodiments enumerated above, will become apparent from the following detailed description, taken in conjunction with the accompanying drawings, which illustrate, by way of example, the principles of the ruler and method of use.

DETAILED DESCRIPTION OF THE INVENTION

Figure 1:
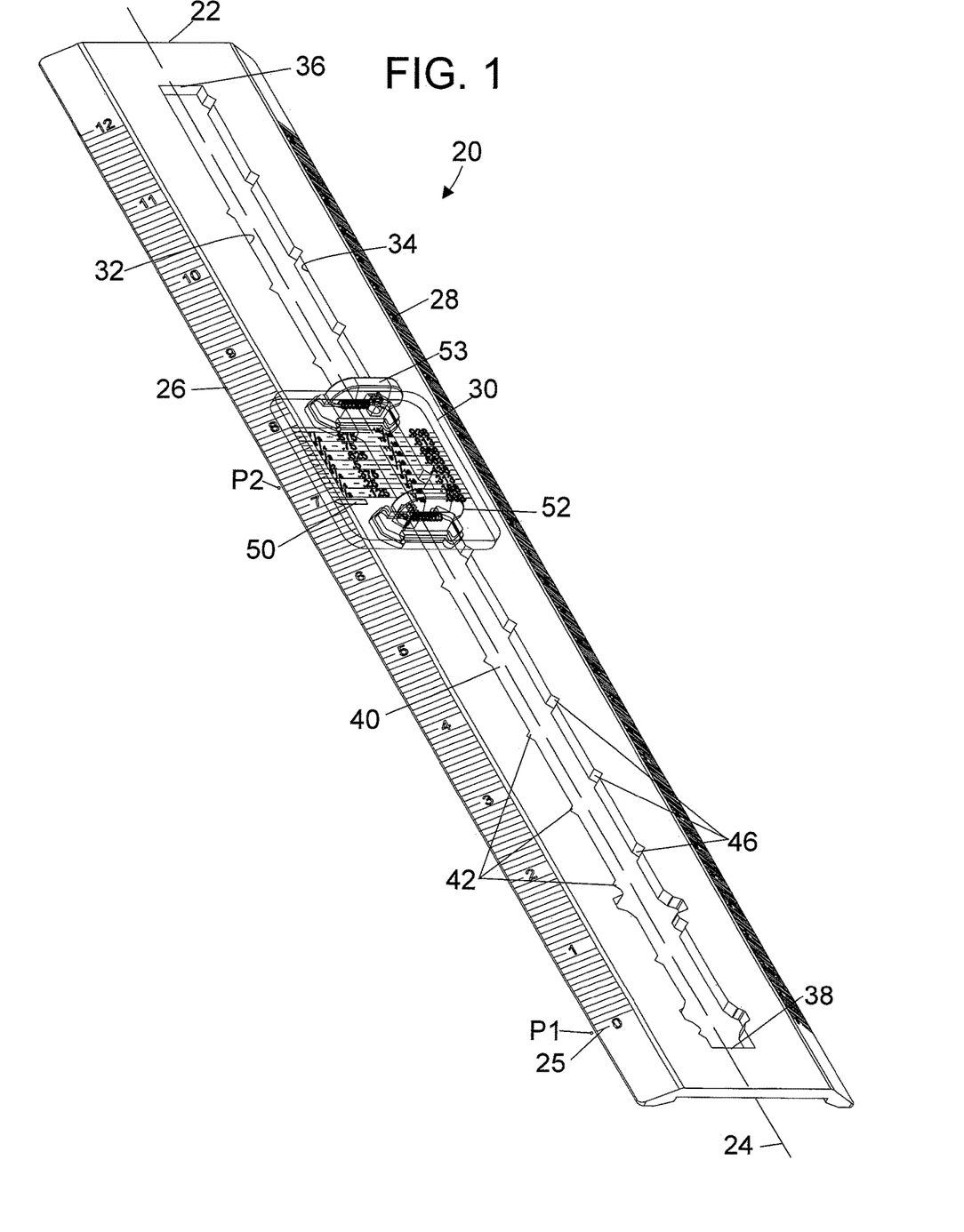
FIG. 1 is a perspective view of a ruler having a slidable scale.
Figure 2:
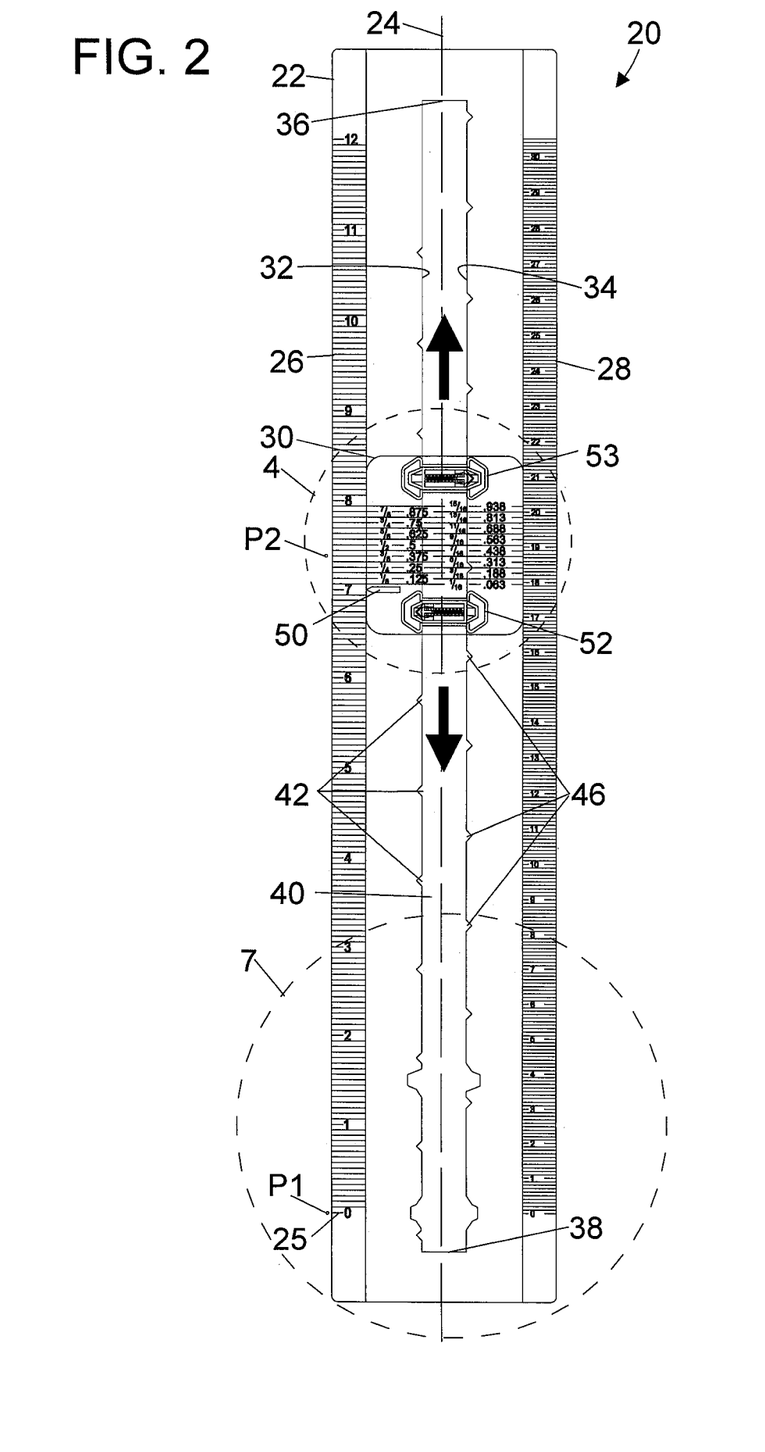
FIG. 2 is a top plan view of the ruler.
Figure 3:
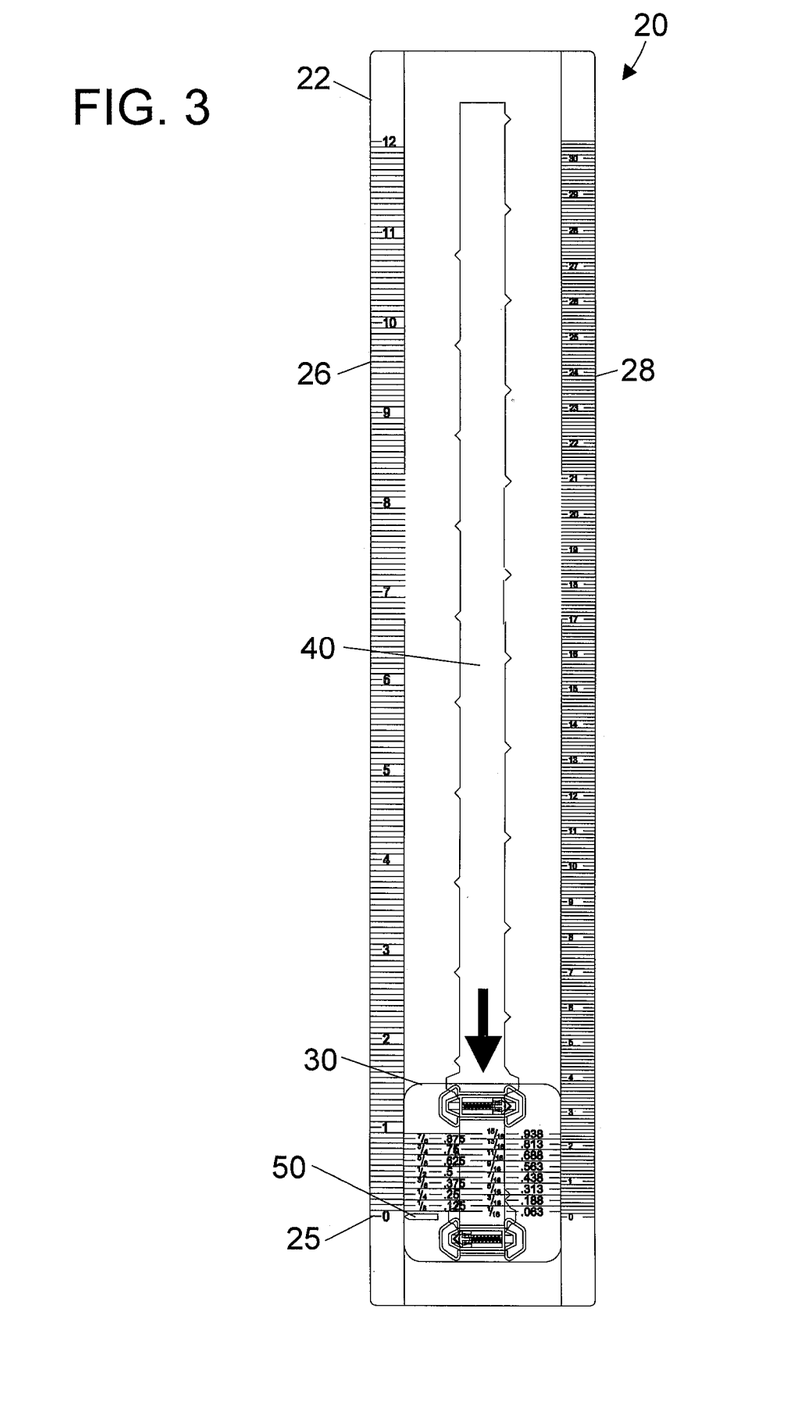
FIG. 3 is a top plan view of the ruler with a scale slidably positioned to a different position.

Referring initially to FIGS. 1-3 there are illustrated perspective and top plan view of a ruler generally designated as 20. Ruler 20 has an elongated base 22 which has a longitudinal axis 24, a first outer edge 26, and an opposite second outer edge 28. First outer edge 26 has indicia of inches, and second outer edge 28 has indicia of centimeters. A scale 30 is received by base 22. Scale 30 is slidably positionable along longitudinal axis 24 to a plurality of detent positions. That is, as scale 30 is moved by a user along longitudinal axis 24 it locks at spaced-apart positions, and stably remains locked until it is dislodged by a user-applied force (see discussion below). Scale 30 includes indicia depicting both fractional and decimal portions of one inch (also refer to FIG. 6).

Figure 9:
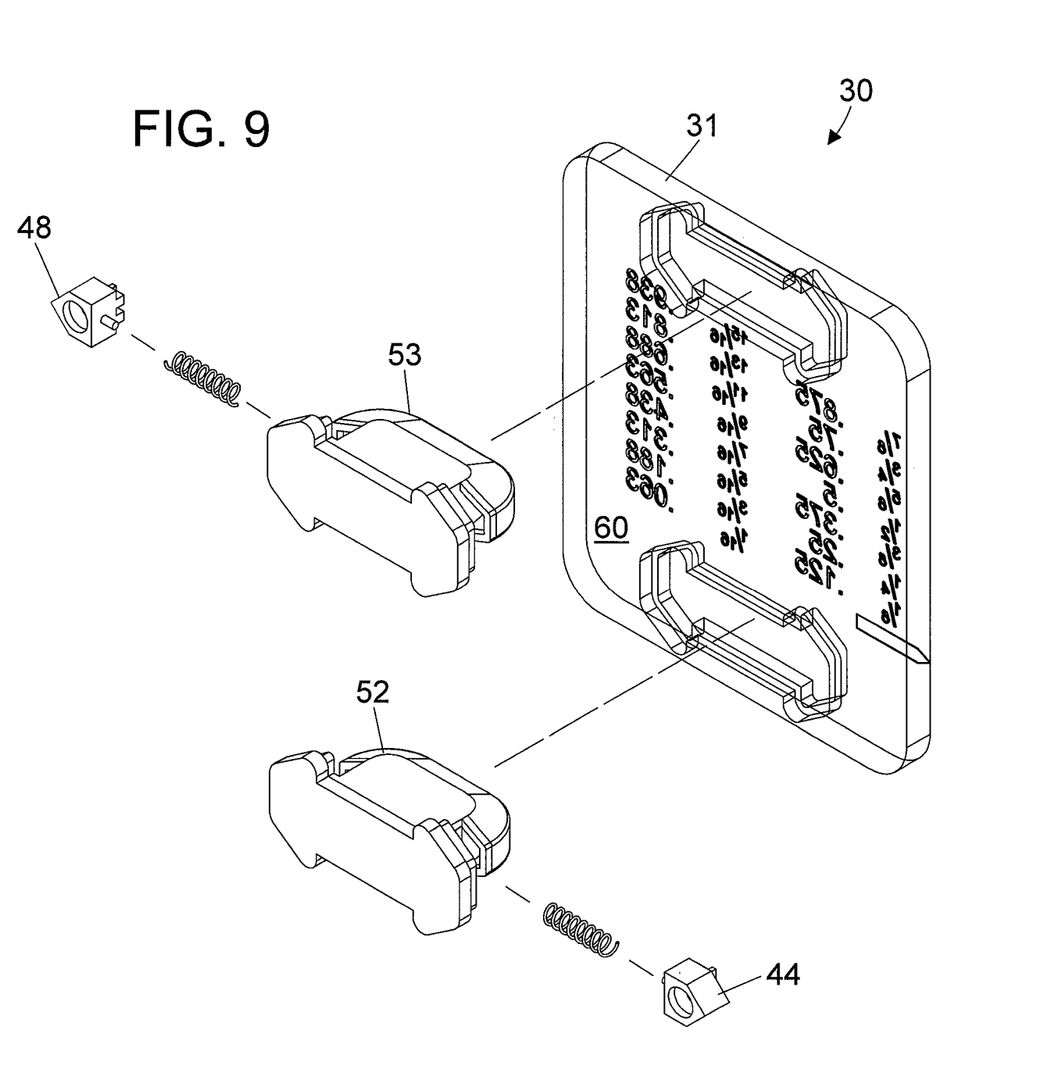
FIG. 9 is an enlarged exploded rear perspective view of the scale.

Referring to FIG. 2, base 22 includes a first inner edge 32, an opposite second inner edge 34, a first inner end edge 36, and an opposite second inner end edge 38. First inner edge 32, second inner edge 34, first inner end edge 36 and second inner end edge 38 combine to form a longitudinal slot 40 which is centrally disposed in base 22. Scale 30 is connected to and received by and longitudinally positionable along slot 40. That is, scale 30 can be moved back and forth along slot 40 to effect different measurements. First inner edge 32 includes a plurality of spaced apart first notches 42 which in the shown embodiment are spaced one inch apart. Referring also to FIG. 9, scale 30 includes an outwardly biased (with a spring) first stop 44 which engages one of the plurality of first notches 42. Second inner edge 34 includes a plurality of spaced apart second notches 46 which in the shown embodiment are spaced one inch apart. Also referring to FIG. 9, scale 30 includes an outwardly biased (with a spring) second stop 48 which engages one of the plurality of second notches 46. It is the action of stops 44 and 48 engaging one of notches 42 and 46 which implements the detent feature of the present ruler. As scale 30 is longitudinally moved by a user along slot 40, stops 44 and 48 sequentially engage different notches 42 and 46 resulting in detent positions which are one inch apart. In FIG. 2 it is noted that the plurality of first notches 42 is longitudinally offset from the plurality of second notches 46 by one half inch. It is further noted that in another embodiment, second notches 34 and second stop 48 can be eliminated.

In FIGS. 1 and 2 scale 30 has been positioned to a 7 inch detent position, whereas in FIG. 3 scale 30 has been positioned to a 0 inch or index detent position. Scale 30 includes a scale index 50 which points to first outer edge 26 of base 22, and indicates the detent position in which the scale is in (7 for FIGS. 1, 2, and 4, and 0 for FIG. 3, etc.). In total there are 12 inch detent positions for scale 30 marked 0-11 on first outer edge 26. In FIG. 1, ruler 20 is positioned to measure the distance between first point P1 and second point P2.

In FIGS. 1-3 it is noted that base 22 includes an index mark 25. Index mark 25 is co-located with the 0 inch detent position, and is used as the baseline for distance measurements. In the shown embodiment, index mark 25 is aligned with a first point P1 and the scale indicia is aligned with a second point P2, so that ruler 20 is measuring the distance between points P1 and P2. In the shown embodiment, the distance is 7 and 3/8 inches or 7.375 inches (also refer to FIG. 4). The distance is the sum of the value of the detent reading on first outer edge 26 as indicated by scale index 50 (7) plus the scale indicia reading of 3/8.

Figure 4:
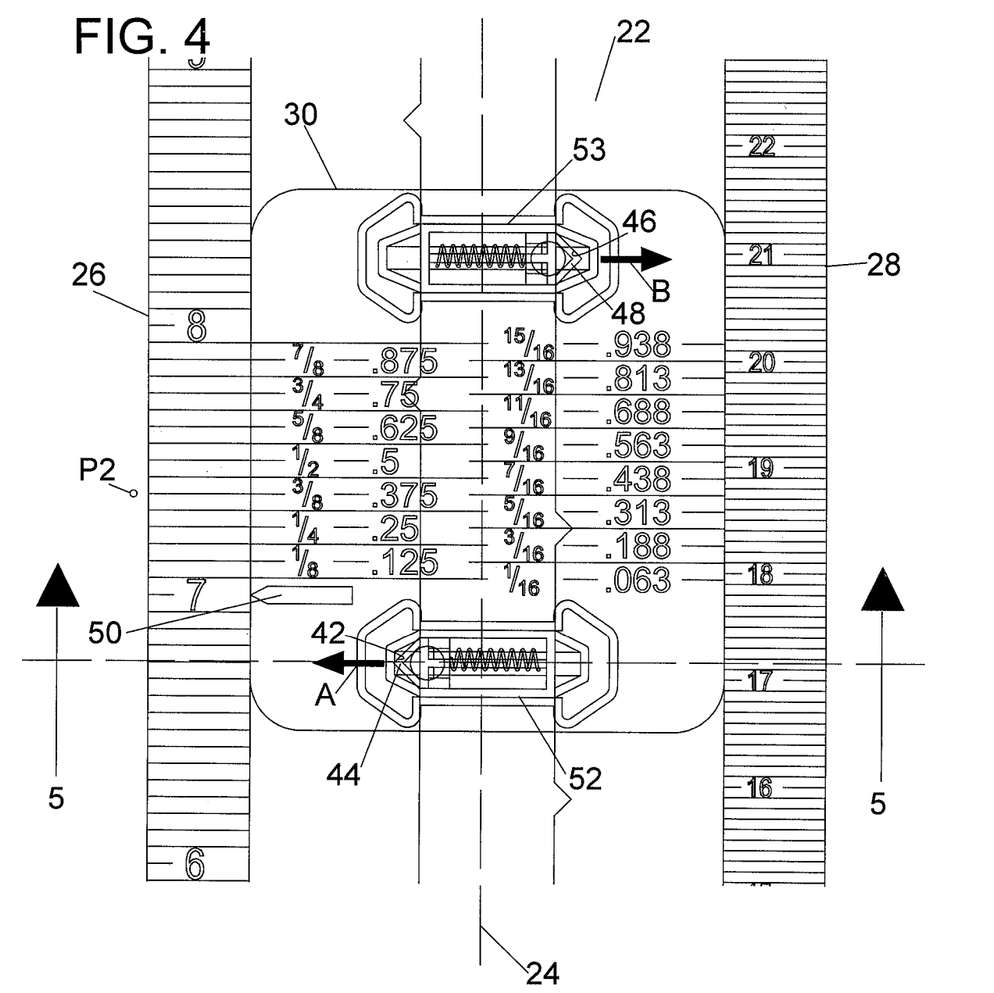
FIG. 4 is an enlarged view of area 4 of FIG. 2.
Figure 5:
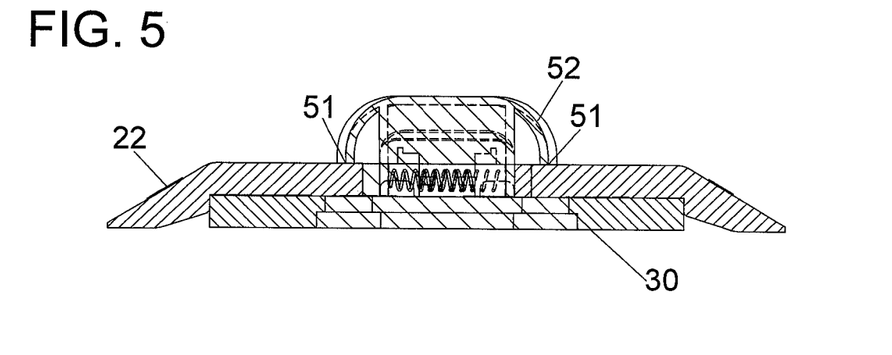
FIG. 5 is a cross sectional view along the line 5-5 of FIG. 4.

FIG. 4 is an enlarged view of area 4 of FIG. 2, and FIG. 5 is a cross sectional view along the line 5-5 of FIG. 4. Scale 30 is positioned to the 7 inch detent position as indicated by scale index 50 which points to 7 inches on first outer edge 26. Stop 44 has been biased into one of first notches 42 in the direction of arrow A, and stop 48 has been biased into one of second notches 46 in the direction of arrow B. It is noted that in the shown embodiment, elongated base 22 and scale 30 are both transparent. Scale 30 has scale indicia which represents one inch of longitudinal length. In the shown embodiment the scale indicia is only one inch and no more. Scale 30 includes a tab 52. Tab 52 is utilized by the user to position scale 30 to a desired position along longitudinal axis 24. Tab 52 serves another purpose. In FIG. it is noted tab 52 holds scale 30 slidably connected to base 22. On the top of base 22, tab 52 extends beyond slot 40 to keep scale 30 connected (at 51). In the shown embodiment, scale 30 also includes a second tab 53 which is spaced apart from tab 52.

Figure 6:
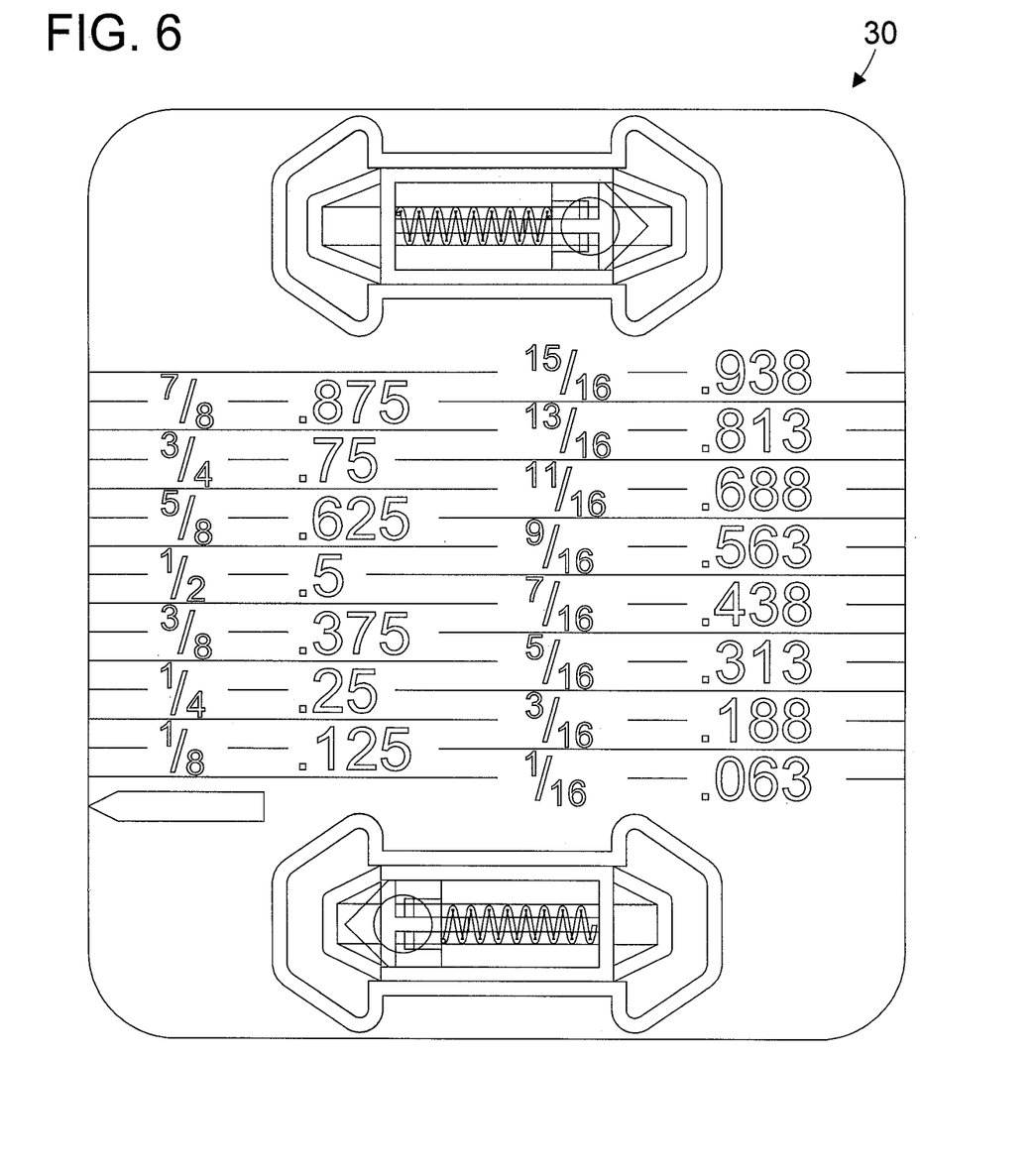
FIG. 6 is an enlarged top plan view of the scale.

FIG. 6 is a top plan view of scale 30. Scale indicia includes both fractional and decimal portions of one inch as shown below:

(a) 7/8, 1/4, 5/8, 1/2, 3/8, 1/4, 1/8;
(b) 0.875, 0.75, 0.625, 0.5, 0.375, 0.25, 0.125;
(c) 15/16, 13/16, 11/16, 9/16, 7/16, 5/16, 3/16, 1/16; and,
(d) 0.938, 0.813, 0.688, 0.563, 0.438, 0.313, 0.188, 063.

In an embodiment the scale indicia includes different colors. This assists the user in making measurements. For example, in one embodiment items (a) and (b) above are red, except that even quarter inch values are black (i.e. 3/4, 0.75, 1/2, 0.5, 1/4, 0.25 are black), and items (c) and (d) are green.

Figure 7:
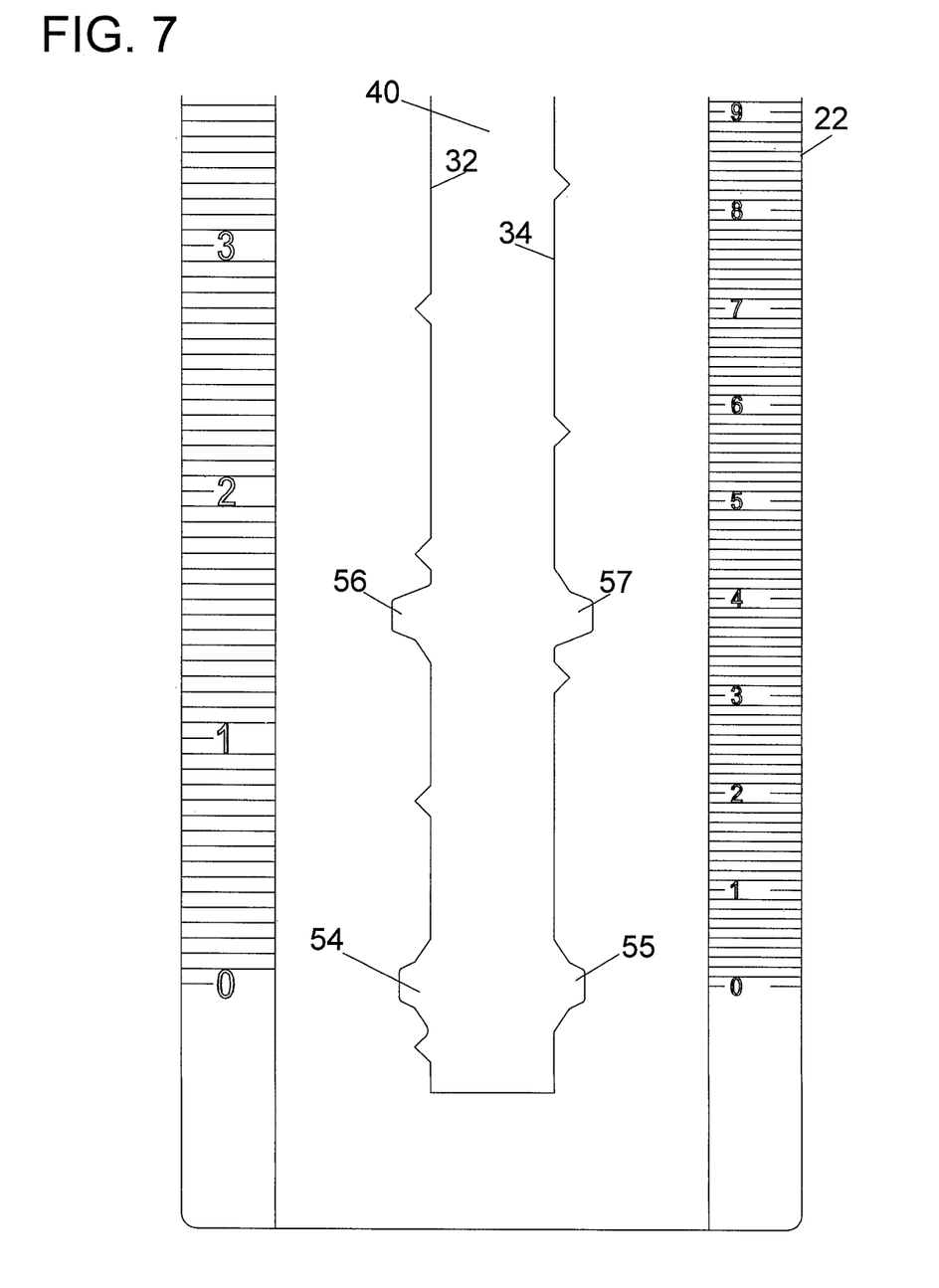
FIG. 7 is an enlarged top plan view of area 7 of FIG. 2.

FIG. 7 is an enlarged top plan view of area 7 of FIG. 2. First inner edge 32 includes a first disassembly notch 54, and second inner edge 34 includes an opposite second disassembly notch 55. First 54 and second 55 disassembly notches are shaped and dimensioned to allow passage of tab 52. In the shown embodiment, scale 30 also includes a second tab 53. First inner edge 32 includes a third disassembly notch 56, and said second inner edge 34 includes an opposite fourth disassembly notch 57. Third 56 and fourth 57 disassembly notches are shaped and dimensioned to allow passage of second tab 53 (refer to FIGS. 4 and 5). Put another way, the disassembly notches cooperate with the tabs to allow scale 30 to be removed from base 22 (refer to FIGS. 9 and 10 and the associated discussions). While the shown embodiment discloses two tabs and four disassembly notches, in another embodiment only one tab and two disassembly notches can be utilized.

Referring to FIG. 3, in an embodiment of ruler 20 the indicia disposed along first outer edge 26 and second outer edge 28 are also color coded. For first outer edge 26 (1) quarter inch values are shown in black (i.e. integer inch values, 1/4 inch, 1/2 inch, and 3/4 inch, (2) eighth inch values are shown in red (i.e. 1/8 inch, 3/8 inch, 5/8 inch, and 7/8 inch, and (3) one sixteenth inch values are shown in green (i.e. 1/16 inch, 3/16 inch, 5/16 inch, 7/16 inch, 9/16 inch, 11/16 inch, 13/16 inch, and 15/16 inch). For second outer edge 28 (1) integer centimeter and half centimeter values are shown in black (e.g. 0, 1 centimeter, 2 centimeter, 3 centimeter etc. and 0.5 centimeter, 1.5 centimeter, 2.5 centimeter etc), (2) odd millimeter values are shown in red (i.e. 1 millimeter, 3 millimeter, 5 millimeter, 7 millimeter, and 9 millimeter, and (3) even millimeter values are shown in green (i.e. 2 millimeter, 4 millimeter, 6 millimeter, and 8 millimeter).

Figure 8:
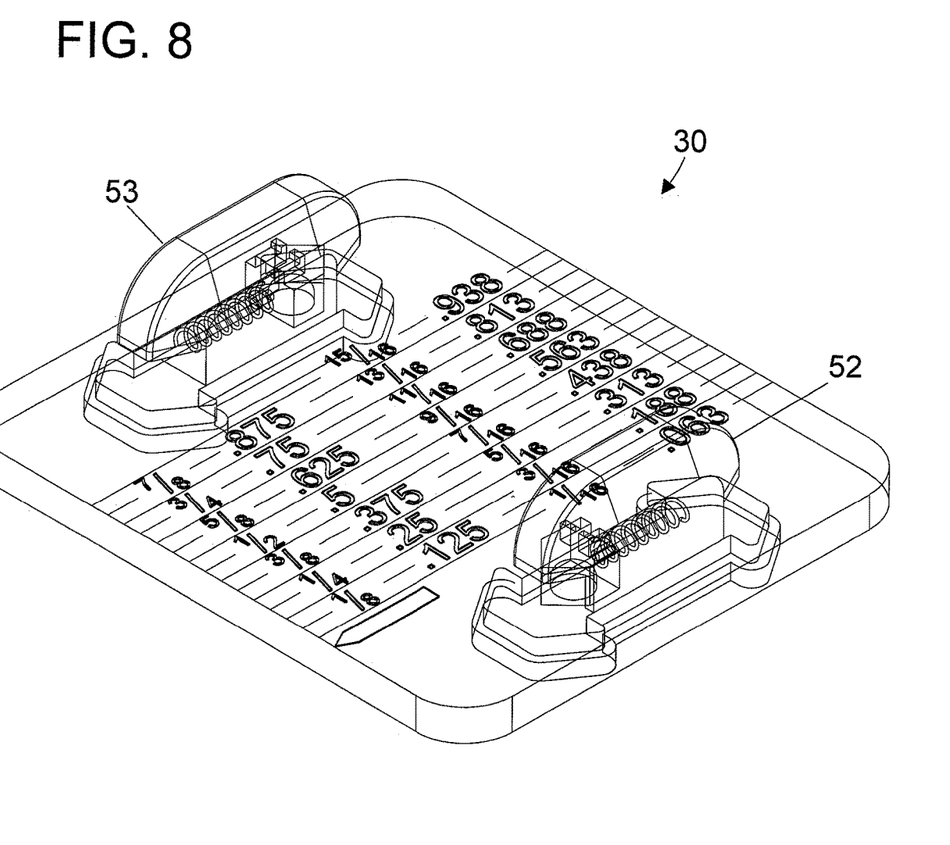
FIG. 8 is an enlarged perspective view of the scale.

FIG. 8 is an enlarged perspective view of the scale 30 showing tab 52, tab 53, and scale indicia.

FIG. 9 is an enlarged exploded rear perspective view of scale 30. Scale 30 has a bottom surface 60, upon which the scale indicia is disposed. As such it is shown in reverse in FIG. 9. Tabs 52 and 53 fit into the body 31 of scale 30. First stop 44 and its associated biasing spring fits into one tab 52, and second stop 48 and its associated spring stops and their associated biasing spring fits into the other tab 53. As was previously discussed, first 44 and second 48 stops engage first 42 and second 46 notches to effect the detent action. It is noted that while in FIG. 9 the tabs 52 and 53, the stops 44 and 48, and the body of scale 30 are separated, in practice all of these elements are integrated into a single scale unit as is shown in FIGS. 8 and 10.

Figure 10:
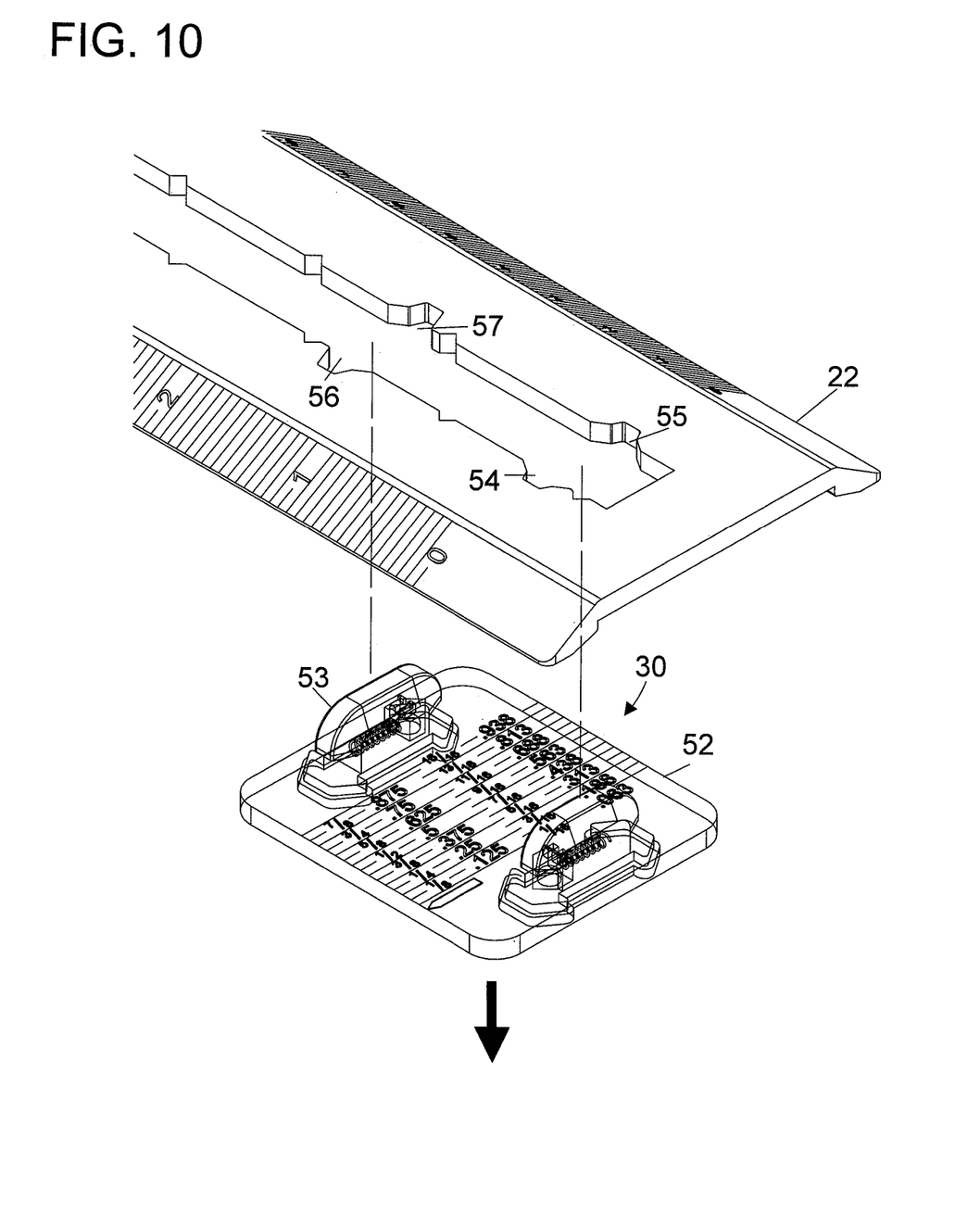
FIG. 10 is an enlarged perspective view showing the scale removed from the base of the ruler; and, FIG. 11 is another enlarged top plan view of the scale.

FIG. 10 is an enlarged perspective view showing scale 30 removed from base of ruler 20. To effect the removal (disassembly) scale 30 is positioned so that tab 52 aligns with first 54 and second 55 disassembly notches, and similarly second tab 53 aligns with third 56 and fourth 57 disassembly notches. The two tabs 52 and 53 are then pushed toward base 22 (down as shown) wherein the two spaced apart tabs pass though the two disassembly notches and scale 30 separates from base 22. In an embodiment one of the tabs is made slightly larger than the other tab, and one of the disassembly notch pairs is made slightly larger than the other. This prevents scale 30 from being installed backwards.

Figure 11:
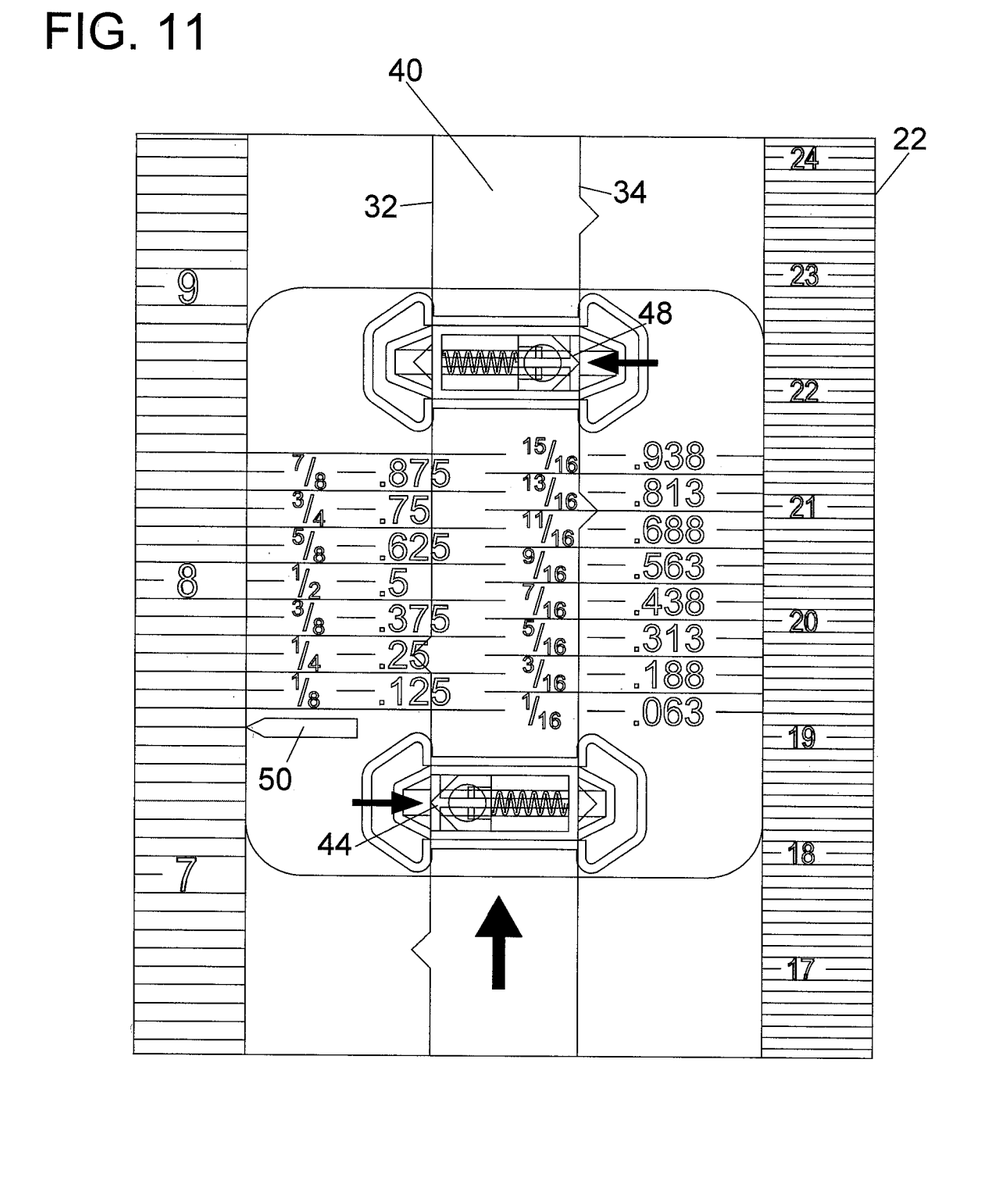

FIG. 11 is another enlarged top plan view of scale 30. In this view scale 30 has been moved from the 7 inch detent position of FIG. 4 to a position of 7.5 inches as indicated by scale index 50. Scale 30 is now between the 7 inch and 8 inch detent positions. First stop 44 and second stop 46 no longer reside in notches 42 and 46, but rather ride along on first edge 32 and second edge 34 between the notches. When scale 30 is in a detent position, a user-applied longitudinal force upon scale 30 overcomes the biasing of stops 44 and 46 and causes the stops to disengage from the notches and ride along the edges of slot 40.

In terms of use, a method for measuring a distance includes: (refer to FIGS. 1-11)
(a) providing a first point P1 and a second point P2;
(b) providing a ruler 20 having an elongated base 22 having a longitudinal axis 24, a first outer edge 26 including inch indicia, an opposite second outer edge 28, an index mark 25, a scale 30 which is received by the base 22, the scale 30 slidably positionable along the longitudinal axis 24 to a plurality of detent positions, the scale including scale indicia depicting both fractional and decimal portions of one inch;
(c) positioning the base 22 so that the index mark 25 aligns with the first point P1;
(d) slidably positioning the scale 30 until the scale indicia aligns with the second point P2; and;
(e) using the scale index 50 and the scale indicia to determine the distance between the first point P1 and the second point P2.

The method further including:
in (a) the base 22 including a first inner edge 32, an opposite second inner edge 34, a first inner end edge 36, an opposite second inner end edge 38, the first inner edge 32, the second inner edge 34, the first inner end edge 36, and the second inner end edge 38 forming a longitudinal slot 40, the scale 30 received by and longitudinally positionable along the slot 40;
in (a) the scale 30 including a tab 52;
in (a) the first inner edge 32 including a first disassembly notch 54, and the second inner edge 34 including an opposite second disassembly notch 55;
the first 54 and second 55 disassembly notches shaped and dimensioned to allow passage of the tab 52;
positioning the scale 30 so that the tab 52 aligns with the first 54 and second 55 disassembly notches; and,
pushing the tab 52 toward the base 22 wherein the tab 52 passes though the first 54 and second 55 disassembly notches and the scale 30 separates from the base 22.

Note—unless specifically otherwise stated, and as applicable, the order of performance of the above cited method steps can be changed.

The embodiments of the ruler and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the ruler and method should be construed as limiting the invention to a particular embodiment or combination of embodiments. The scope of the invention is defined by the appended claims.

I claim:
1. A ruler comprising:
an elongated base having a longitudinal axis, a first outer edge, and an opposite second outer edge;
a scale which is received by said base, said scale slidably positionable along said longitudinal axis to a plurality of detent positions;
said scale including indicia depicting both fractional and decimal portions of one inch;
said base including a first inner edge, an opposite second inner edge, a first inner end edge, an opposite second inner end edge, said first inner edge, said second inner edge, said first inner end edge, and said second inner end edge forming a longitudinal slot:
said scale received by and longitudinally positionable along said slot;
said first inner edge including a plurality of spaced apart first notches;
said scale including an outwardly biased first stop which engages one of said plurality of first notches;
said second inner edge including a plurality of spaced apart second notches; and,
said scale including an outwardly biased second stop which engages one of said plurality of second notches.
2. The ruler according to claim 1 further including:
said plurality of detent positions being one inch apart.
3. The ruler according to claim 1 further including;
said plurality of first notches spaced one inch apart.
4. The ruler according to claim 1 further including;
said plurality of second notches spaced one inch apart.
5. The ruler according to claim 1 further including:
said plurality of first notches longitudinally offset from said plurality of second notches by one half inch.
6. The ruler according to claim 1 further including:
said scale including a tab;
said first inner edge including a first disassembly notch, and said second inner edge including an opposite second disassembly notch; and,
said first and second disassembly notches shaped and dimensioned to allow passage of said tab.
7. The ruler according to claim 6 further including:
said scale including a second tab;
said first inner edge including a third disassembly notch, and said second inner edge including an opposite fourth disassembly notch; and,
said third and fourth disassembly notches shaped and dimensioned to allow passage of said second tab.
8. The ruler according to claim 1 further including:
said scale having scale indicia representing one inch.
9. The ruler according to claim 8 further including:
said scale having a bottom surface; and,
said scale indicia disposed on said bottom surface of said scale.
10. The ruler according to claim 8 further including;
said scale indicia including;
7/8, 3/4, 5/8, 1/2, 3/8, 1/4, 1/8;
0.875, 0.75, 0.625, 0.5, 0.375, 0.25, 0.125;
13/16, 11/16, 9/16, 7/16, 5/16, 3/16, 1/16; and,
0.938, 0.813, 0.688, 0.563, 0.438, 0.313, 0.188, 063.
11. The ruler according to claim 8 further including:
said scale indicia including different colors.
12. The ruler according to claim 1 further including:
said elongated base and said scale both being transparent.
13. The ruler according to claim 1 further including:
said first outer edge having indicia of inches; and,
said second outer edge having indicia of centimeters.

14. The ruler according to claim 1 further including:

said plurality of detent positions being one inch apart;

said plurality of first notches longitudinally offset from said plurality of second notches by one half inch;

said scale including a tab;

said first inner edge including a first disassembly notch, and said second inner edge including an opposite second disassembly notch;

said first and second disassembly notches shaped and dimensioned to allow passage of said tab;

said scale including a second tab;

said first inner edge including a third disassembly notch, and said second inner edge including an opposite fourth disassembly notch;

said third and fourth disassembly notches shaped and dimensioned to allow passage of said second tab;

said scale having scale indicia representing one inch;

said scale having a bottom surface;

said scale indicia disposed on said bottom surface of said scale said scale indicia including;

7/8, 3/4, 5/8, 1/2, 3/8, 1/4, 1/8;

0.875, 0.75, 0.625, 0.5, 0.375, 0.25, 0.125;

13/16, 11/16, 9/16, 7/16, 5/16, 3/16, 1/16; and, 0.938, 0.813, 0.688, 0.563, 0.438, 0.313, 0.188, 063 said scale indicia including different colors;

said elongated base and said scale both being transparent;

said first outer edge having indicia of inches; and, said second outer edge having indicia of centimeters.

15. A method for measuring a distance comprising:

(a) providing a first point and a second point;

(b) providing a ruler having an elongated base having a longitudinal axis, a first outer edge including inch indicia, an opposite second outer edge, an index mark, a scale which is received by said base, said scale slidably positionable along said longitudinal axis to a plurality of detent positions, said scale including scale indicia depicting both fractional and decimal portions of one inch, said scale including a scale index;

(c) positioning said base so that said index mark aligns with said first point;

(d) slidably positioning said scale until said scale indicia aligns with said second point;

(e) using said scale index and said scale indicia to determine the distance between said first point and said second point;

in (a) said base including a first inner edge, an opposite second inner edge, a first inner end edge, an opposite second inner end edge, said first inner edge, said second inner edge, said first inner end edge, and said second inner end edge forming a longitudinal slot, a scale received by and longitudinally positionable along said slot;

in (a) said scale including a tab;

in (a) said first inner edge including a first disassembly notch, and said second inner edge including an opposite second disassembly notch;

said first and second disassembly notches shaped and dimensioned to allow passage of said tab;

positioning said scale so that said tab aligns with said first and second disassembly notches; and, pushing said tab toward said base wherein said tab passes though said first and second disassembly notches and said scale separates from said base.

\* \* \* \* \*